Figure 1:
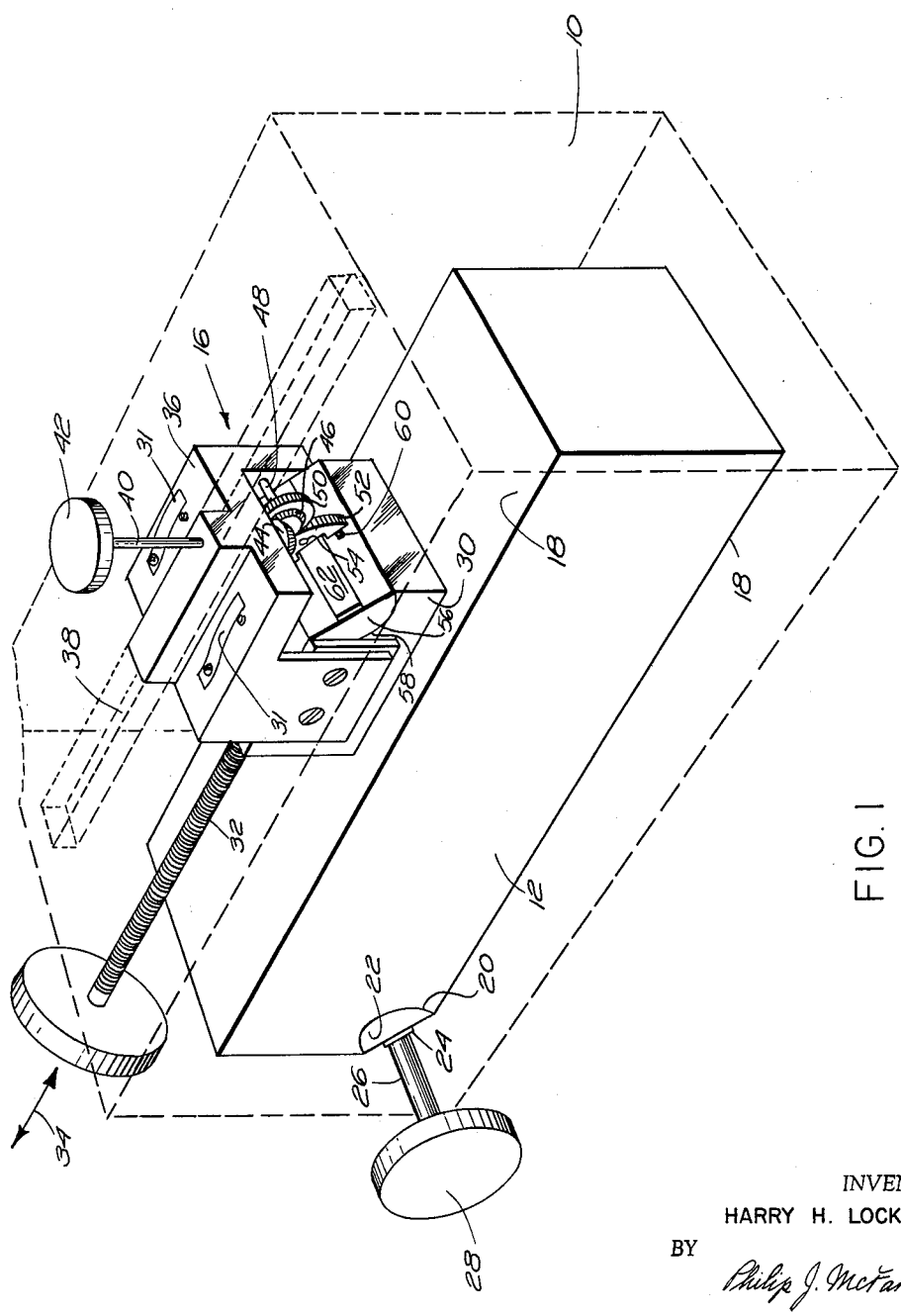

Sept. 10, 1963     H. H. LOCKHART     3,103,640
VARIABLE ULTRASONIC DELAY LINE

Filed June 19, 1961     2 Sheets-Sheet 1

INVENTOR.
HARRY H. LOCKHART
BY
*Philip J. McFarland*
ATTORNEY

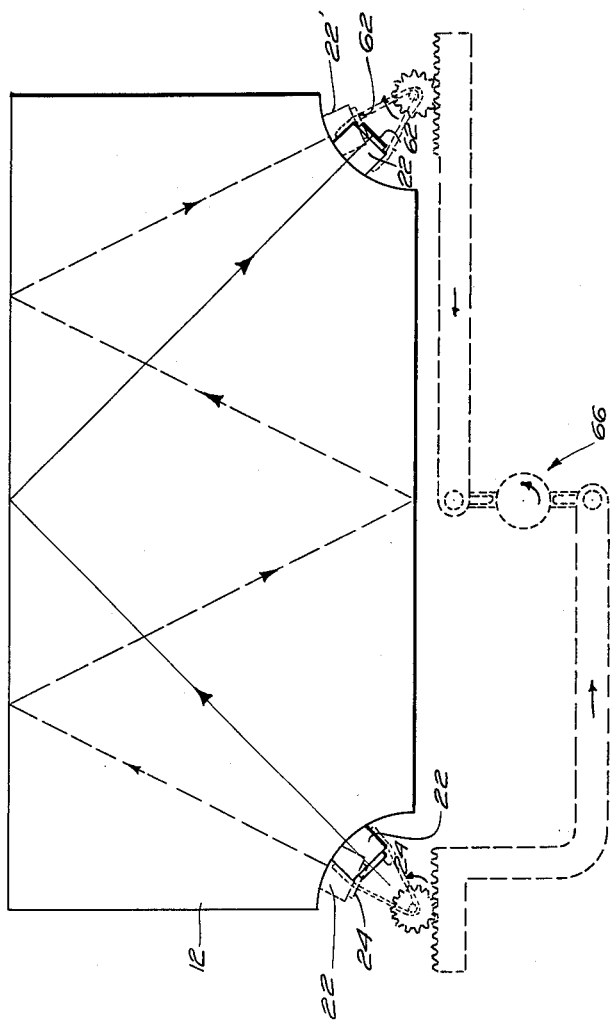

United States Patent Office 3,103,640
Patented Sept. 10, 1963

3,103,640
VARIABLE ULTRASONIC DELAY LINE
Harry H. Lockhart, Natick, Mass., assignor to Laboratory for Electronics, Inc., Boston, Mass., a corporation of Delaware
Filed June 19, 1961, Ser. No. 118,122
4 Claims. (Cl. 333—30)

This invention pertains generally to ultrasonic delay lines and particularly to variable solid ultrasonic delay lines.

Several kinds of variable ultrasonic delay lines are known in the art. Among such devices are the delay line disclosed by Johnson in U.S. Patent #2,659,053, and by Arenberg in U.S. Patent #2,703,867.

According to the former reference, two elongated pieces of an acoustic transmitting medium, as quartz, are movably disposed with respect to each other so that the acoustical path from one end of the first medium to the opposite end of the second medium may be varied. A transmitting transducer, as a piezo electric crystal, is intimately attached to one end of the first medium and a similar receiving transducer is attached to the opposite end of the second medium. Thus, the length of the path of acoustic energy propagated in a straight line between the two transducers may be changed to effect the desired delay. However, since the effective aperture of the delay line varies as the two transducers are moved with respect to each other, the usable range of adjustment possible with this construction is limited.

According to the disclosure of one embodiment of a delay line in the latter reference, the acoustic transmitting medium is accurately shaped to form an isosceles triangle. A transmitting and a receiving transducer are slidably mounted facing each other on opposite legs of such a triangle. Consequently, when the triangle is moved in a direction normal to its base, the length of the path of acoustic energy in the acoustic transmitting medium between the transmitting transducer and the receiving transducer may be varied to effect the desired delay.

Another type of variable delay line is shown in my copending application entitled "Variable Ultrasonic Delay Line," Serial No. 113,937, filed May 31, 1961. In the just cited type of delay line, a transmitting and a receiving transducer are supported on movable acoustic couplers on the tapered sides of a wedge-shaped acoustic transmitting medium. When the couplers are moved, the length of the path of acoustic energy reflected in the acoustic transmitting medium is varied as desired.

While all the cited kinds of known delay lines are satisfactory in operation insofar as providing means for varying the delay time of acoustic energy, great care must be exercised to ensure proper operation of any of them. As is well known, the acoustic energy must impinge upon the receiving transducer at a critical angle, depending upon the type of transducer used, for most efficient transfer of acoustic energy to such a transducer. Consequently, during fabrication, it is extremely important that the angular relationship between the various elements be kept within close tolerances if the finally assembled device is to operate at maximum efficiency.

Therefore, it is an object of the invention to provide a solid variable ultrasonic delay line in which the angular relationship of a transmitting and/or a receiving transducer may be adjusted with respect to an acoustic transmitting medium as desired during operation.

Another object of the invention is to provide a variable ultrasonic delay line having an extremely large range of adjustment in delay time.

Still another object of the invention is to provide a solid variable ultrasonic delay line having one range of delay times which may be varied in steps.

These and other objects of the invention are attained generally by providing a solid acoustic delay line incorporating means for adjusting the length of the path of acoustic energy in an acoustic transmitting medium and also for adjusting the entrance angle and the exit angle of acoustic energy with respect to such a medium to ensure transmittal of the maximum amount of acoustic energy through a folded path from a transmitting transducer to a receiving transducer, regardless of the length of the path of acoustic energy.

For a more complete understanding of the invention, reference is now made to the accompanying drawings, in which:

FIG. 1 is a simplified isometric view, partially in phantom, of a variable delay line incorporating the invention; and FIG. 2 is a schematic drawing illustrating a modification of the delay line shown in FIG. 1.

Referring now to FIG. 1 it may be seen that a preferred embodiment of the invention consists basically of a case 10 supporting an acoustic transmitting medium 12, a transmitting transducer assembly 14 and a receiving transducer assembly 16. The acoustic transmitting medium 12 preferably consists of a block, say of quartz, having two planar parallel sides 18. Means (not shown) are provided for attaching the acoustic transmitting medium 12 in any known way to the case 10. A cylindrical section 20 is formed in the acoustic transmitting medium 12 adjacent one corner thereof so as to accommodate a complementary acoustic coupler 22, as shown. The acoustic coupler 22 is preferably fabricated from an acoustic transmitting material, as quartz. A transmitting transducer 24, as a piezo electric crystal, is mounted on the acoustic coupler 22 in any convenient manner so that ultrasonic vibrations of the transmitting transducer are transmitted through the acoustic coupler 22 to the acoustic transmitting medium 12. A shaft 26, which passes through the case 10 to an adjusting knob 28, is attached to the acoustic coupler 22 in any convenient manner. It will be noted in passing that, in addition to the just enumerated elements, commonly used means, as one or more springs (not shown), may be provided to ensure contact between the complementary surfaces of the acoustic coupler 22 and the cylindrical section 20 and that any known lubricant (not shown) may be placed between such complementary surfaces.

The receiving transducer assembly 16 consists of an adapter 30 movably mounted on the upper planar surface 18 of the acoustic transmitting medium 12 and pressed into contact therewith as by springs 31. Affixed to the adapter 30 is a shaft 32 which in turn is led through a threaded opening (not numbered) in the case 10 to a positioning knob 34. Also attached to the adapter 30 is a bridle 36 which slides in a groove 38 formed in the case 10. A shaft 40, to which a knob 42 is affixed, is rotatably supported in the bridle 36. A bevel gear 44 in turn is attached to the lower end of the shaft 40 so as to mesh with a second bevel gear 46, which latter element is supported on a stub shaft 48 projecting inwardly from the bridle 36. A spur gear 50 is coaxially mounted on stub shaft 48 so as to mesh with a sector of a second spur gear 52 on a shaft 54 which also is supported by bridle 36. An acoustic coupler 56 having a cylindrical surface rests in a complementary curved section 58 in the adapter 30, the acoustic coupler 56 being pressed into position by means of springs 60 (one of which is shown) disposed between the upper surface of the acoustic coupler 56 and the adjacent surface of the spur gear 52. A receiving transducer 62, again for example, a piezo-electric crystal, is cemented or otherwise attached, to the acoustic coupler 56. It will be noted in passing that any known lubricant may be placed between the complementary surfaces of the acoustic coupler 56 and the adapter 30 and between the planar surface 18 and the adjoining surface of the adapter 30.

To complete the assembly, proper known electrical connections (not shown) are made to permit energization of the transmitting transducer 24 and connection of the receiving transducer 62 to an external circuit.

To operate the device illustrated in FIG. 1, the position of the receiver transducer 62 along the length of the acoustic transmitting medium 12 is set (by operating knob 34 so as to move adapter 30 and the elements supported thereby along planar surface 18) and the two transducers 24, 62 are rotated (by operation of adjusting knob 28 and knob 42) until the desired number of reflections of the acoustic energy in the acoustic transmitting medium 12 is attained and the maximum amount of such energy is received by the receiving transducer 62. In the illustrated case it will be seen that the latter conditions are met when the receiving transducer 62 is parallel to the transmitting transducer 24. It is apparent too, that the delay time may be varied within large limits by varying the number of reflections taken by the acoustic energy in the acoustic transmitting medium 12.

It is not necessary that the two transducers 24, 62 be provided with independent rotating means. That is, the two elements may be mechanically linked, if desired, so that the required angular relationship between the two is maintained in operation. It will be recognized that, for any given position of the adapter 30 on the planar surface 18, the inclination of both the transmitting transducer 24 and the receiving transducer 62 to the acoustic transmitting medium 12 must be varied in discrete steps if the maximum amount of energy of the transmitted energy is to be received.

The just mentioned fact is utilized in the step line illustrated schematically in FIG. 2. Thus, a transmitting transducer 24 is supported on a first acoustic coupler 22 on a first cylindrical section of an acoustic transmitting medium 12. A receiving transducer 62 is supported on a second acoustic coupler 22′, similar to the acoustic coupler 22, on a second cylindrical section of the acoustic transmitting medium 12. Means, as for example a double rack and pinion assembly 66 shown in phantom, are provided to move the transmitting transducer 24 and the receiving transducer 62 in opposite directions in their respective curved sections of the acoustic transmitting medium 12. It is apparent that, having once properly adjusted the mechanical linkage, the two transducers may be moved to the positions indicated by the solid lines in FIG. 2 so that acoustic energy arriving normally at the receiving transducer may have been reflected only once from a reflecting wall of the acoustic transmitting medium 12. It is equally apparent that the two transducers 24, 62 may be moved to other positions, as, for example, the positions shown in dotted lines in FIG. 2, so that the acoustic energy between the two transducers 24, 62 will be reflected an odd integral number of times in the acoustic transmitting medium 12 before the acoustic energy impinging normally on the receiving transducer 62. In other words, the receiving transducer 62 is energized, for all practical purposes, only when it is at any one of a number of discrete positions in each of which the acoustic energy from the transmitting transducer 24 impinges normally on the receiving transducer 62. It is evident from FIG. 2, however, that the length of the path of the acoustic energy in the acoustic transmitting medium differs as the two transducers 24, 62 are rotated, and that such length increases with the number of reflections.

It will be apparent to those having skill in the art that many modifications of the described embodiments of the invention will be possible without departing from its inventive concepts. It is to be recognized, therefore, that the invention should not be limited to its disclosed embodiments but rather by the spirit and scope of the appended claims.

What is claimed is:

1. A solid variable ultrasonic delay line, comprising:
   (a) an acoustic transmitting medium having opposed parallel sides;
   (b) a transmitting transducer mounted adjacent to the first one of the opposing sides;
   (c) a receiving transducer mounted adjacent the second one of the opposing sides to vary the distance between the transmitting and the receiving transducer; and,
   (d) means for adjusting the position of the transmitting and receiving transducer with respect to the acoustic transmitting medium, the means including an acoustic coupler in the form of a right cylinder fabricated from an acoustic transmitting material and means for mating the curved part of the acoustic coupler to the acoustic transmitting medium to incline the two transducers at identical angles to the longitudinal axis of the acoustic transmitting medium.

2. A solid variable delay line as in claim 1 having, in addition, means for rotating each one of the acoustic couplers.

3. A solid variable ultrasonic delay line comprising an acoustic transmitting medium, a transmitting and a receiving acoustic transducer, means for slidably mounting the transmitting and the receiving transducer on the acoustic transmitting medium to vary the length of the path of acoustic energy in the acoustic transmitting medium and means for simultaneously rotating the transmitting and the receiving transducer with respect to the acoustic transmitting medium to cause the acoustic energy to be reflected at least one at a surface of the acoustic transmitting medium in its travel from the transmitting transducer to the receiving transducer.

4. A solid variable ultrasonic delay line as in claim 3 wherein rotation of the transmitting and the receiving transducer is responsive to the means for slidably mounting the transmitting and the receiving transducer to hold constant the number of reflections of the acoustic energy in the acoustic transmitting medium.

References Cited in the file of this patent

UNITED STATES PATENTS

| | | |
|---|---|---|
| 2,703,867 | Arenberg | Mar. 8, 1955 |
| 2,839,731 | McSkimin | June 17, 1958 |
| 2,867,777 | Robinson | Jan. 6, 1959 |
| 2,872,577 | Hart | Feb. 3, 1959 |
| 2,957,142 | May | Oct. 18, 1960 |